(12) United States Patent
Lee et al.

(10) Patent No.: US 10,719,472 B2
(45) Date of Patent: Jul. 21, 2020

(54) INTERFACE CIRCUIT AND PACKET TRANSMISSION METHOD THEREOF

(71) Applicant: Samsung Electronics Co., Ltd., Suwon-si, Gyeonggi-do (KR)

(72) Inventors: Eunji Lee, Seoul (KR); Junghyo Woo, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 16/216,071

(22) Filed: Dec. 11, 2018

(65) Prior Publication Data

US 2019/0108156 A1 Apr. 11, 2019

Related U.S. Application Data

(62) Division of application No. 14/697,815, filed on Apr. 28, 2015, now Pat. No. 10,185,687.

(30) Foreign Application Priority Data

Aug. 8, 2014 (KR) .................. 10-2014-0102427

(51) Int. Cl.
*G06F 13/40* (2006.01)
*G06F 13/42* (2006.01)
*G06F 12/0866* (2016.01)

(52) U.S. Cl.
CPC ...... *G06F 13/4027* (2013.01); *G06F 12/0866* (2013.01); *G06F 13/4282* (2013.01); *G06F 2212/222* (2013.01)

(58) Field of Classification Search
None
See application file for complete search history.

(56) References Cited

U.S. PATENT DOCUMENTS

| | | | |
|---|---|---|---|
| 7,221,684 B1 | 5/2007 | Smith et al. | |
| 7,274,711 B2 | 9/2007 | Kajizaki et al. | |
| 7,609,723 B2 | 10/2009 | Munguia | |
| 8,117,525 B2 | 2/2012 | Wood et al. | |
| 8,139,575 B2 | 3/2012 | Biran et al. | |
| 8,514,797 B2 | 8/2013 | Corral | |
| 2003/0126188 A1 | 7/2003 | Ta et al. | |
| 2004/0233933 A1* | 11/2004 | Munguia | H04L 12/4633 370/473 |
| 2005/0251611 A1 | 11/2005 | Creta et al. | |
| 2007/0079044 A1* | 4/2007 | Mandal | G06F 13/404 710/310 |

(Continued)

FOREIGN PATENT DOCUMENTS

| | | | |
|---|---|---|---|
| JP | 2002-009832 A | 1/2002 | |
| JP | 2005-049818 A | 2/2005 | |

(Continued)

*Primary Examiner* — Scott C Sun
(74) *Attorney, Agent, or Firm* — Harness, Dickey and Pierce, P.L.C.

(57) ABSTRACT

A packet transmission method includes packaging a plurality of data in the form of a payload; storing information on whether the plurality of data are packaged in a header, the payload or a CRC area including a transmission error check code of the plurality of data; combining the header, the payload, and the CRC area with each other to generate a transaction layer packet; and outputting a packet including the transaction layer packet.

8 Claims, 14 Drawing Sheets

(56) References Cited

U.S. PATENT DOCUMENTS

| | | |
|---|---|---|
| 2008/0069125 A1 | 3/2008 | Reed et al. |
| 2013/0086336 A1 | 4/2013 | Canepa et al. |
| 2013/0166813 A1 | 6/2013 | Chandra et al. |
| 2013/0173834 A1 | 7/2013 | Glaser et al. |
| 2013/0173837 A1 | 7/2013 | Glaser et al. |
| 2014/0281108 A1* | 9/2014 | Pethe ................ G06F 13/4027 710/313 |

FOREIGN PATENT DOCUMENTS

| | | |
|---|---|---|
| JP | 2008-236378 A | 10/2008 |
| KR | 10-2003-0057453 A | 7/2003 |

* cited by examiner

INTERFACE CIRCUIT AND PACKET TRANSMISSION METHOD THEREOF

CROSS-REFERENCE TO RELATED APPLICATIONS

This US non-provisional patent application is a divisional application of U.S. application Ser. No. 14/697,815, filed on Apr. 28, 2015, which claims priority under 35 USC § 119 to Korean Patent Application No. 10-2014-0102427, filed on Aug. 8, 2014, the entire contents of each of which is incorporated by reference in its entirety herein.

BACKGROUND

Technical Field

Example embodiments relate to interface circuit techniques. For example, at least some example embodiments relate to an interface circuit to generate and transmit multi-data according to communication protocols.

Discussion of Related Art

An interface circuit may transmit data within a computer system or between different computer systems by using various manners. Some computer systems may transmit data through an interface circuit in units of packets. An interface circuit may transmit data according to communication protocols. The interface circuit may operate according to protocols such as Fiber Channel (FC), Universal Serial Bus (USB) 3.0, Serial Attached SCSI (SAS), and Peripheral Component Interface Express (PCIe).

An interface circuit based on the PCIe protocol may include a payload and a header. The payload may have a size of 4,064 bytes and the payload may include valid data. The header may contain information on the valid data included in the payload.

The PCIe interface circuit allows data to exchange between a host processor and a nonvolatile memory device by packaging the data into a plurality of packets and transmitting the packaged data packets using a plurality of cache lines, respectively.

However, the cache line data of the host processor may have a small size of 64 bytes or 128 bytes. Therefore, as the number of packets used to transmit data having a small size increases, the amount of overhead caused by a header included in each of the packets may also increase. Thus, the amount of time to transmit the packets may increase.

SUMMARY OF THE INVENTION

At least some example embodiments are related to an interface circuit and a packet transmission method thereof.

For example, some example embodiments relate to a packet transmission method of an interface circuit.

In some example embodiments, the packet transmission method may include packaging a plurality of data in the form of a payload; storing information on whether the plurality of data are packaged in a header, the payload or a CRC area including a transmission error check code of the plurality of data; combining the header, the payload, and the CRC area with each other to generate a transaction layer packet; and outputting a packet including the transaction layer packet.

In some example embodiments, the packet transmission method may further include storing meta data to indicate addresses for the plurality of data in at least one of the header, the payload, and the CRC area.

In some example embodiments, the information on whether the plurality of data are packaged may be stored in a reserved bit area of the header.

In other example embodiments, the packet transmission method may include receiving a packet; checking whether a plurality of data are packaged into a transaction layer packet of the received packet; and decoding and outputting the plurality of data packaged into the transaction layer packet in the form of a payload according to a result of the checking.

In some example embodiments, checking whether the plurality of data are packaged may be performed by information stored in the payload.

In some example embodiments, checking whether the plurality of data are packaged may be performed by at least one of a header of the transaction layer packet and an CRC area including a transmission error check code of the plurality of data.

In some example embodiments, the packet transmission method may further include decoding meta data to indicate addresses for the plurality of data.

Other example embodiments relate to an interface circuit for transmitting and receiving first and second packets according to the PCIe protocol.

In some example embodiments, the interface circuit may include a transmission unit configured to output the first packet; and a reception unit configured to receive the second packet.

In some example embodiments, the transmission unit may include a payload generator configured to package a plurality of data into the first packet in the form of a payload; a header generator configured to generate a header including a bit on whether the plurality of data are packaged; a combiner configured to generate the first packet including the payload, the header, and a first CRC area including a transmission error check code of the plurality of data; and a transmitter configured to output the first packet.

In some example embodiments, the header generator may generate the header including meta data to indicate addresses for the plurality of data.

In some example embodiments, the payload generator may generate a payload including the meta data to indicate the addresses for the plurality of data.

In some example embodiments, the combiner may generate a data link layer packet including a sequence number and a second CRC area at both ends of the transaction layer packet.

In some example embodiments, the combiner may generate the first packet in the form of a physical layer packet where a framing bit is added to both ends of the data layer packet.

In some example embodiments, the interface circuit may further include a receiver configured to receive the second packet; and a decoder configured to determine whether a plurality of the second packet are packaged and decode a payload of the second packet to output a plurality of data.

In some example embodiments, the decoder may check whether the plurality of data are packaged, through interpretation of the second packet.

In some example embodiments, the interface circuit may transmit data stored in a plurality of cache lines of a host processor after packaging the data into the packet.

In some example embodiments the interface circuit may include a receiver, a processor and a transmitter.

The receiver may be configured to receive data, the data being one of a single first packet and a plurality of separate first packets, the single first packet having a single header and a plurality of write data packaged into a first transaction layer packet therein such that each of the write data is associated with a different address of a nonvolatile memory, and the plurality of separate first packets having a plurality of read data dispersed therebetween and each packet of the plurality of separate first packets having an associated separate header.

The processor may be configured to, determine if the received data is the single first packet or the plurality of separate first packets, and if the determining determines that the received packet is the single first packet, then decode the single first packet to extract the plurality of write data and associated meta data, the associated meta data indicating the different addresses, and if the determining determines that the received packet is the plurality of separate first packets, then generating a physical layer packet by packaging the plurality of read data into the payload of a second transaction layer packet, inserting a bit into the header of the second transaction packet indicating that the plurality of data is packaged into the payload and attaching additional information to both ends of the second transaction layer packet.

The transmitter may be configured to transmit the physical layer packet or the extracted plurality of write data.

BRIEF DESCRIPTION OF THE DRAWINGS

The accompanying drawings are included to provide a further understanding of the disclosure, and are incorporated in and constitute a part of this specification. The drawings illustrate some example embodiments and, together with the description, serve to explain principles of the example embodiments. In the drawings.

DETAILED DESCRIPTION

Figure 1:
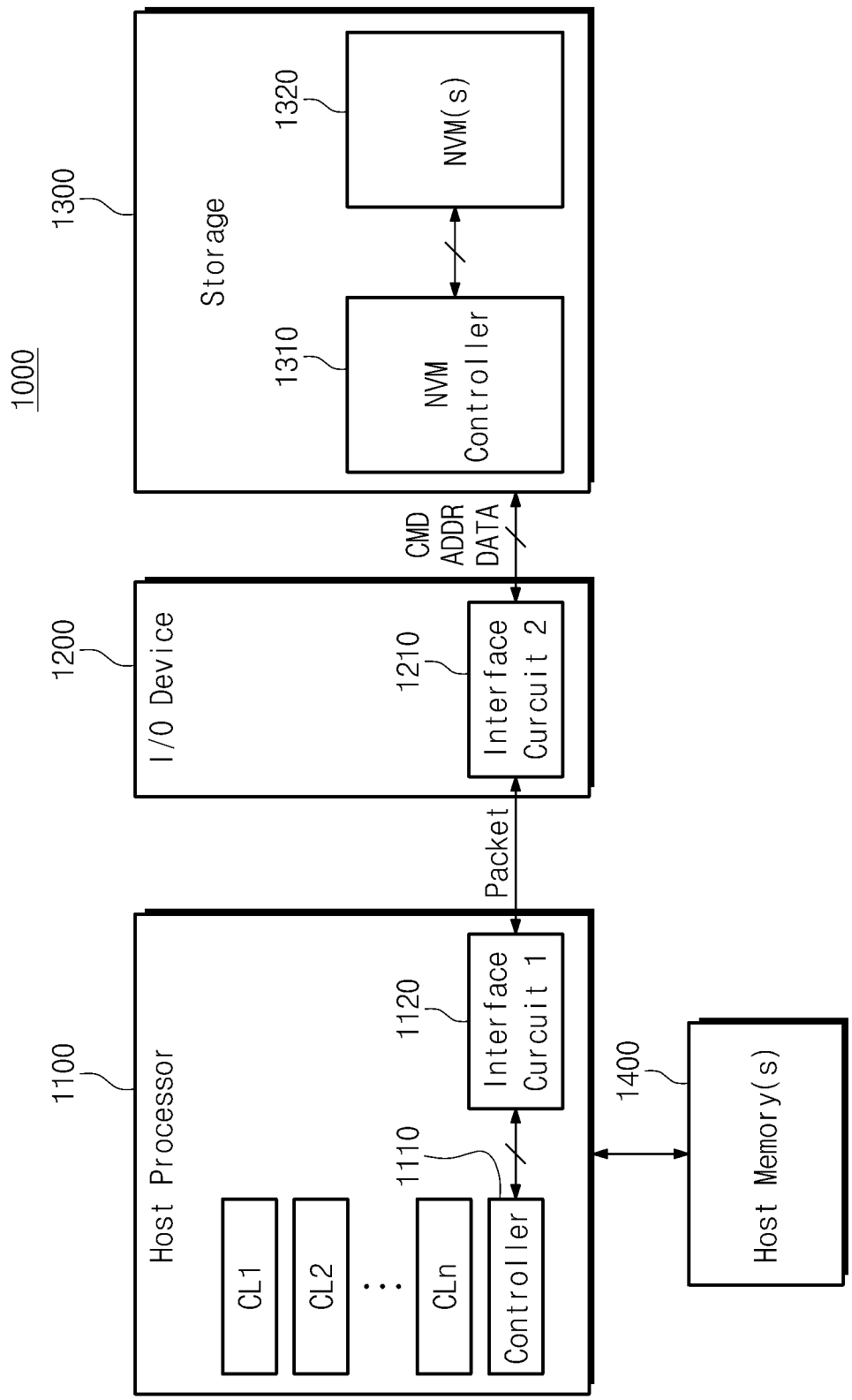
FIG. 1 is a block diagram of a computing device according to some example embodiments of the inventive concepts.

Some example embodiments in accordance with the inventive concepts will now be described more fully hereinafter with reference to the accompanying drawings.

Example embodiments will now be described more fully with reference to the accompanying drawings, in which some example embodiments are shown. In the drawings, the thicknesses of layers and regions are exaggerated for clarity Like reference numerals in the drawings denote like elements.

Detailed illustrative example embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising,"

"includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a block diagram of a computing device 1000 according to some example embodiments of the inventive concepts.

Referring to FIG. 1, as illustrated, the computing device 1000 may include a host processor 1100, an input/output (I/O) device 1200, a storage device 1300, and at least one host memory 1400.

The host processor 1100 may control the overall operation of the computing device 1000. The host processor 1100 may include first to nth cache lines CL1 to CLn, a controller 1110, and a first interface circuit 1120. The cache lines CL1 to CLn may temporarily store data to be transmitted to the storage device 1300. In addition, the cache lines CL1 to CLn may temporarily store data received from the storage device 1300. Each of the cache lines CL1 to CLn may store data having a size of 64 bytes. However, a size of data stored by each of the cache lines CL1 to CLn is not limited to 64 bytes.

The controller 1110 may control the overall operation of the host memory 1400. The controller 1110 may control data transmission of the cache lines CL1 to CLn and the first interface circuit 1120. The controller 1110 controls data output from the cache lines CL1 to CLn to the first interface circuit 1120. The controller 1110 controls input of data stored in the cache lines CL1 to CLn.

The first interface circuit 1120 may receive data packaged in the form of a packet according to a communication protocol. The first interface circuit 1120 may follow protocols such as Fiber Channel (FC), Universal Serial Bus (USB) 3.0, Serial Attached SCSI (SAS), and Peripheral Component Interface Express (PCIe). In some example embodiments of the inventive concepts, let it be assumed that the first interface circuit 1120 may operate according to the PCIe protocol. However, example embodiments are not limited thereto.

When a program request of data is issued, the first interface circuit 1120 may transmit data in the form of a plurality of packets after sequentially packaging the data. In some example embodiments, the first interface circuit 1120 may transmit a plurality of data after packaging the plurality of data into a single packet.

When a read request of data is issued, the first interface circuit 1120 may receive data of the storage device 1300 from the I/O device 1200 in the form of a packet. The first interface circuit 1120 may receive a plurality of packets each including data. The first interface circuit 1120 may receive a single packet that packages a plurality of data. The first interface circuit 1120 may decode the received packets or the received single packet. Data obtained through decoding may be stored in each of the cache lines CL1 to CLn according to the control of the controller 1110.

The I/O circuit 1200 may perform communication between the host processor 1100 and the storage device 1300. The I/O circuit 1200 may transmit and decode between the host processor 1100 and the storage device 1300. The I/O circuit 1200 includes a second interface circuit 1210 to transmit and decode a packet.

The second interface circuit 1210 may package or decode data into a packet according to a communication protocol. The second interface circuit 1210 may follow protocols such as Fiber Channel (FC), Universal Serial Bus (USB) 3.0, Serial Attached SCSI (SAS), and Peripheral Component Interface Express (PCIe). In embodiments of the inventive concept, let it be assumed that the second interface circuit 1210 may operate according to the PCIe protocol.

When a program request to program data into the storage device 1300 is issued, the second interface circuit 1210 may receive a plurality of packets or a single packet from the first interface circuit 1120. The second interface circuit 1210 may decode the received packets or the received single packet to transmit a command CMD, an address ADDR, and data DATA to the storage device 1300.

When a read request to read data from the storage device 1300 is issued, the second interface circuit 1210 may receive the data from the storage device 1300. The second interface circuit 1210 may transmit a plurality of received data to the host processor 1100 after packaging each of the plurality of received data into a packet. The second interface circuit 1210 may transmit a plurality of received data to the host processor 1100 after packaging the plurality of received data into a single packet.

The storage device 1300 may include a memory controller 1310 and at least one nonvolatile memory device 1320. The memory controller 1310 may control the overall operation of the at least one nonvolatile memory device 1320.

The at least one nonvolatile memory device 1320 may be at least one of a flash memory, a phase-change RAM (PRAM), a magnetic RAM (MRAM), a resistive RAM (RRAM), a ferroelectric RAM (FRAM), and a vertical NAND (VNAND) flash memory.

In some example embodiments, the nonvolatile memory device 1320 may be a three dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some example embodiments, the 3D memory array may include vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The host memory 1400 is connected to the host processor 1100. The host memory 1400 may store data required data according to the control of the host processor 1100. The host memory 1400 may be implemented using a nonvolatile memory such as a dynamic RAM (DRAM) or a phase-change RAM (PRAM).

The first and second interface circuits 1120 and 1210 may transmit and receive a plurality of data after packaging the plurality of data into a plurality of packets, respectively. However, conventionally, when a size of packets is small, the relative amount of space used by a header increases, and, therefore overhead caused by the headers included in each of the packets may increase. For example, conventionally, when a plurality of data packets having a capacity of 64 bytes are transmitted after being packaged into a plurality of packets having headers, respectively, transmission time may increases by about 35 percent as compared to that when only data is transmitted. In contrast, in one or more example embodiments, a plurality of data is packaged into a single packet before transmission. Therefore, to the data transmission method according to one or more example embodiments may decrease such an overhead.

Figure 2:
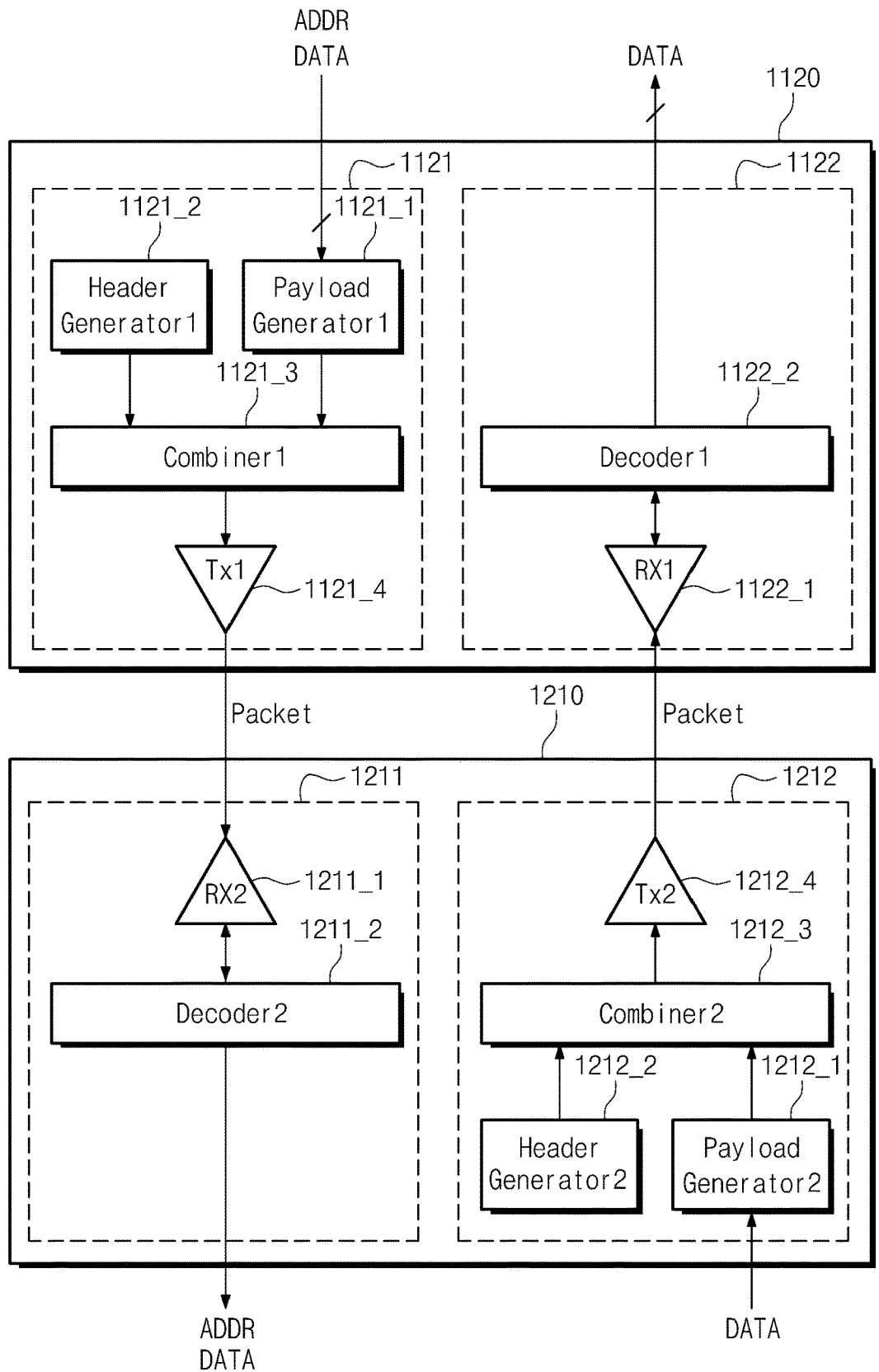
FIG. 2 is a block diagram illustrating a configuration that an interface circuit according to some example embodiments of the inventive concepts may have.

FIG. 2 is a block diagram illustrating a configuration that an interface circuit according to some example embodiments of the inventive concepts may have.

Referring to FIG. 2, FIG. 2 illustrates configurations of the first and second interface circuits 1120 and 1210 in FIG. 1.

The first interface circuit 1120 may include a first transmission unit 1121 and a first reception unit 1122. The first transmission unit 1121 may include a first payload generator 1121_1, a first head generator 1121_2, a first combiner 1121_3, and a first transmitter 1121_4.

The first payload generator 1121_1 may receive a plurality of data DATA and a plurality of addresses ADDR. The first payload generator 1121_1 combines the plurality of data DATA with meta data including addresses ADDR to generate a single payload. The addresses ADDR include information on an address where each of the plurality of data DATA is input. A payload may mean a portion of a packet in which actual data and meta data are included. The first payload generator 1121_1 may store information to indicate inclusion of the plurality of data DATA and the meta data in a payload.

The first header generator 1121_2 generates a header including the information of the plurality of data DATA included in the payload. For example, the header according to example embodiments of the inventive concepts may include information indicating that a plurality data DATA and meta data including address ADDR are included in a single packet. The first header generator 1121_2 may store a command CMD to indicate whether to perform a read operation or a program operation on the header.

The first combiner 1121_3 may combine the header and a payload generated by the first header generator 1121_2 and the first payload generator 1121_1, respectively, to generate a single packet. The header and the payload constitute a transaction layer packet. The first combiner 1121_3 combines additional information with the transaction layer packet to generate a physical layer packet. Thus, the first combiner 1121_3 outputs a single packet in the form of the physical layer packet to the first transmitter 1121_4.

The first transmitter 1121_4 may output a completed packet. The first transmitter 1121_4 may output the completed packet to the second interface circuit 1210.

As discussed above, the first interface circuit 1120 may also include the first reception unit 1122. The first reception unit 1122 may include a first receiver 1121_1 and a first decoder 1122_2.

The first receiver 1122_1 may receive a packet from the second interface circuit 1210. The first receiver 1122_1 outputs the received packet to the first decoder 1122_2.

The first decoder 1122_2 may decode the received packet. The first decoder 1122_2 may analyze a header of the decoded packet. The first decoder 1122_2 may determine whether a plurality of data DATA is included in a payload or single data is included in the payload. The first decoder 1122_1 may analyze the payload to obtain the plurality of data DATA. The first decoder 1122_1 may transmit the plurality of data DATA included in the payload to a host processor 1100.

The second interface circuit 1210 may include a second reception unit 1211 and a second transmission unit 1212. A configuration and an operating method of the second interface circuit 1210 may be similar to those of the first interface circuit 1120.

The second reception unit 1211 may include a second receiver 1211_1 and a second decoder 1211_2. The second receiver 1211_1 may receive a packet from the first transmitter 1121_4. The second receiver 1211_1 may output the received packet to the second decoder 1211_2.

The second decoder 1211_2 analyzes a header to determine whether a plurality of data DATA and meta data are packaged into a packet. The second decoder 1211_2 additionally analyzes a plurality of addresses ADDR included in the meta data of the payload. The second decoder 1211_2 outputs the plurality of data DATA to correspond to an indication of the addresses ADDR.

The second transmitter 1212 may include a second payload generator 1212_1, a second header generator 1212_2, a second combiner 1212_3, and a second transmitter 1212_4.

The second payload generator 1212_1 may receive a plurality of data DATA from a storage device 1300. The second payload generator 1212_1 may package the plurality of data DATA into a single payload. The second payload generator 1212_1 may store information to indicate inclusion of the plurality of data DATA in the payload.

The second header generator 1212_2 may generate a header including information of the plurality of data DATA included in the payload. Specifically according to some example embodiments of the inventive concepts the second header generator 1212_2 may generate the header such that the header includes information to indicate whether a plurality of data DATA are included in a single packet.

The second combiner 1212_3 may combine the header and the payload generated through the second payload generator 1212_1 and the second header generator 1212_1 to generate a single packet. The header and the payload constitute a transaction layer packet of the packet. The second combiner 1212_3 may generate a packet constituting a physical layer defined by the PCIe protocol. The second combiner 1212_3 outputs a single packet in the form of a physical layer packet to the second combiner 1212_4.

The second transmitter 1212_4 receives a single packet from the second combiner 1212_3. The second transmitter 1212_4 may output the received single packet to the first interface circuit 1120.

As discussed above, the first and second interface circuits 1120 and 1210 may transmit or receive a plurality of data DATA after packaging the plurality of data DATA into a single packet. Thus, transmission efficiency may be improved as compared to when the plurality of data DATA is packaged into a plurality of packets.

The first interface circuit 1120 and the second interface circuit 1210 may each include a processor and a memory. The memory may be any device capable of storing data including magnetic storage, flash storage, etc. The processor may be any device capable of processing data including, for example, a microprocessor configured to carry out specific operations by performing arithmetical, logical, and input/output operations based on input data, or capable of executing instructions included in computer readable code stored in the memory. The processor may be a logic chip, for example, a central processing unit (CPU), a controller, or an application-specific integrated circuit (ASIC), that when, executing the instructions stored in the memory, configures the processor as a special purpose machine to perform the operations illustrated in one or more of FIGS. 7, 8, 10, 11, 13 and 14, discussed below. For example, the instructions may configure the processor to package a plurality of data into a transaction layer packet (TLP) to transmit more data at one time. Thus, the processors may improve the functioning of the interface circuits.

Figure 3:
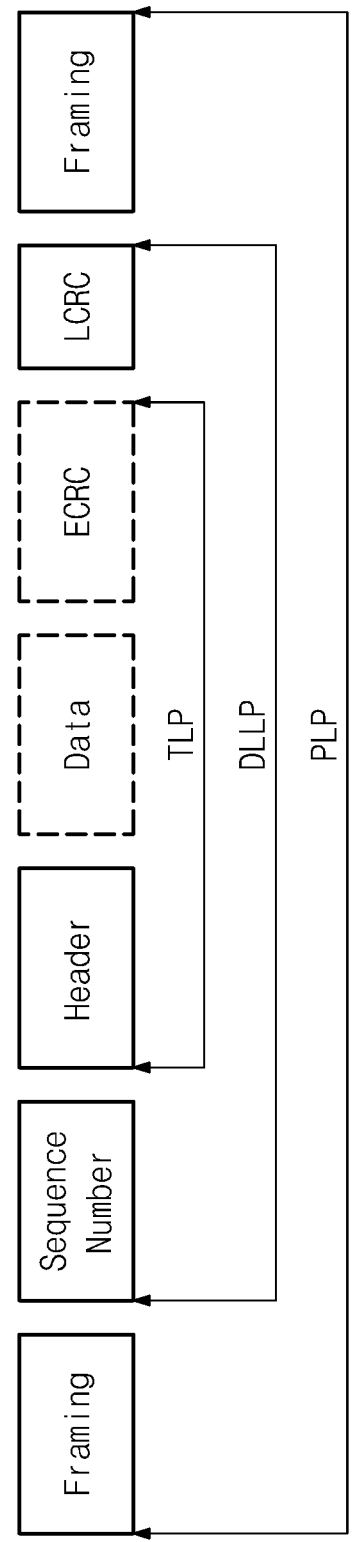
FIGS. 3 and 4 are block diagrams illustrating a structure of a packet.
Figure 4:
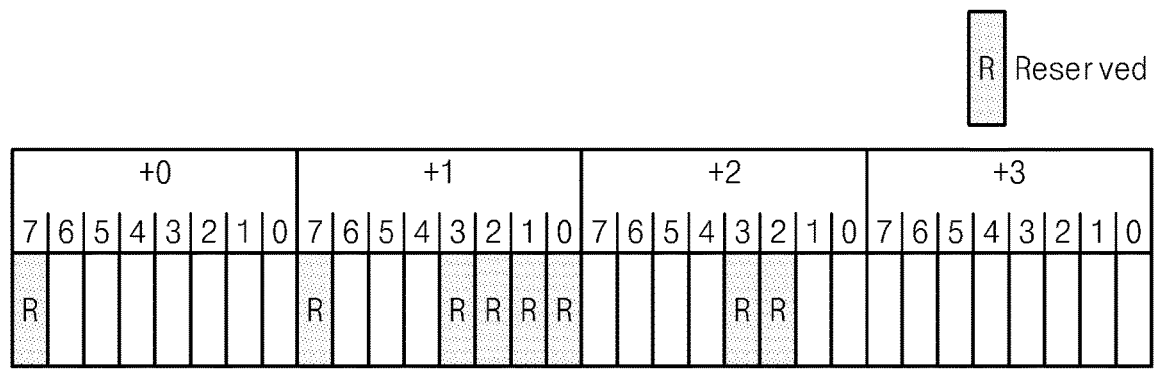

FIGS. 3 and 4 are block diagrams illustrating a structure of a packet.

Referring to FIGS. 2 and 3, FIG. 3 illustrates a configuration of a packet. The packet may include a transaction layer packet (TLP), a data link layer packet (DLLP), and a physical layer packet (PLP).

The transaction layer packet (TLP) may include a header, data, and an additional end-to-end cyclic redundancy check (ECRC) area. A portion in which data is included is called a payload. The ECRC area may include a cyclic code for error detection during data transmission of the transaction layer packet (TLP).

The transaction layer packet (TLP) according to some example embodiments of the inventive concepts may include a plurality of data DATA and addresses ADDR. The header of the TLP packet may include information to indicate that the plurality of data DATA and the addresses are included in the payload. A configuration of the transaction layer packet (TLP) will be described in further detail with reference to drawings below.

The data link layer packet (DLLP) manages error detection. During transmission, the data link layer packet (DLLP) may include a sequence number and a link cyclic redundancy check (LCRC) area added to ends of the transaction layer packet (TLP). The data link layer packet (DLLP) is a short packet to exchange information in both of a link such as delivery response.

The physical layer packet (PLP) may be formed by adding a framing bit to both ends of the data link layer packet (DLLP). The framing bit is a control character to detect start and end of the transaction layer packet (TLP). The physical layer packet (PLP) is in the form of being transmitted or received through the first and second interface circuits 1120 and 1210.

The first and second transmission units 1121 and 1212 may sequentially generate the transaction layer packet (TLP), the data link layer packet (DLLP), and the physical layer packet (PLP) to complete a single packet. The first and second reception units 1122 and 1211 receive the single packet and sequentially decode the physical layer packet (PLP), the data link layer packet (DLLP), and the transaction layer packet (PLP) to read data.

The first and second interface circuits 1120 and 1210 according some example embodiments of the inventive concepts may package a plurality of data into a transaction layer and include information in a header on whether the plurality of data are packaged to generate a single packet.

Referring to FIGS. 2 and 4, FIG. 4 is a block diagram of a header of a packet. The header may have a size of 4 bytes. There may be a plurality of reserved bits (R) in the header. The reserved bits may not include information. Thus, in some example embodiments, information on whether a plurality of data are packaged into a packet may be stored in one or more of the reserved bits. For example, the header generator 1121_2 may store information on whether a plurality of data are packaged into a packet in one or more of the reserved bits.

Apart from a plurality of reserved bit areas in the header, the other bits may include information on length of the header, information on whether there is a payload, and information on types of packets.

Figure 5:
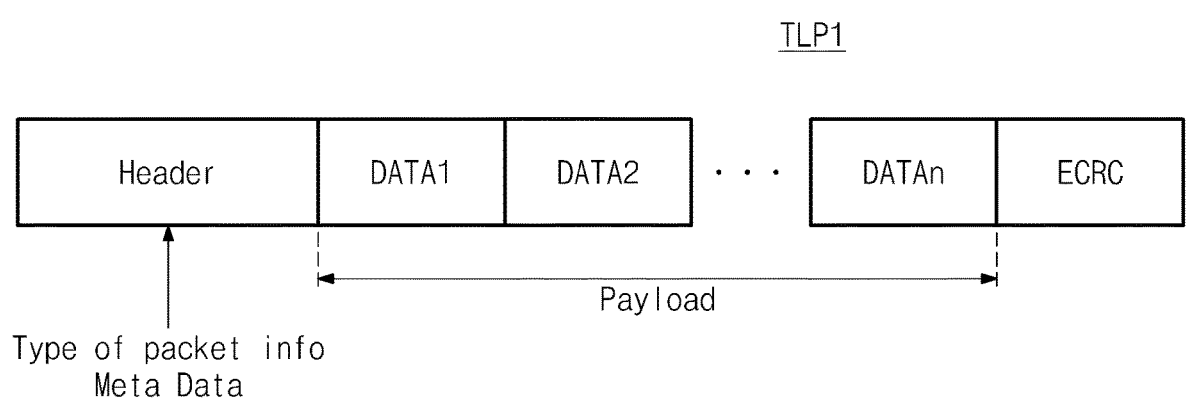
FIG. 5 is a block diagram of a transaction layer packet of a packet according to some example embodiments of the inventive concepts.

FIG. 5 is a block diagram of a transaction layer packet of a packet according to an embodiment of the inventive concept.

Referring to FIG. 5, a first transaction layer packet TLP1 may include a header, a payload, and an ECRC area. The payload of the first transaction layer packet TLP1 may include only a plurality of data DATA1 to DATAn. Meta data including a plurality of addresses ADDR1 to ADDRn for the plurality of data DATA1 to DATAn may be stored in the header. The header generator 1121_2 may store, in the header, an information bit on whether the plurality of data DATA1 to DATAn and multi-data are included in the first transaction layer packet TLP1. The information bit may be stored in a reserved bit included in the header. However, example embodiments of the inventive concepts are not limited thereto. For example, the information bit on type of a packet may be included in a specific area of the payload.

Since the transmission units 1121, 1212 generate the first transaction layer packet TLP1 such that the first transaction layer packet TLP1 packages only the plurality of data DATA1 to DATAn into the payload, the transmission units 1121, 1212 may transmit more data at one time.

Figure 6:
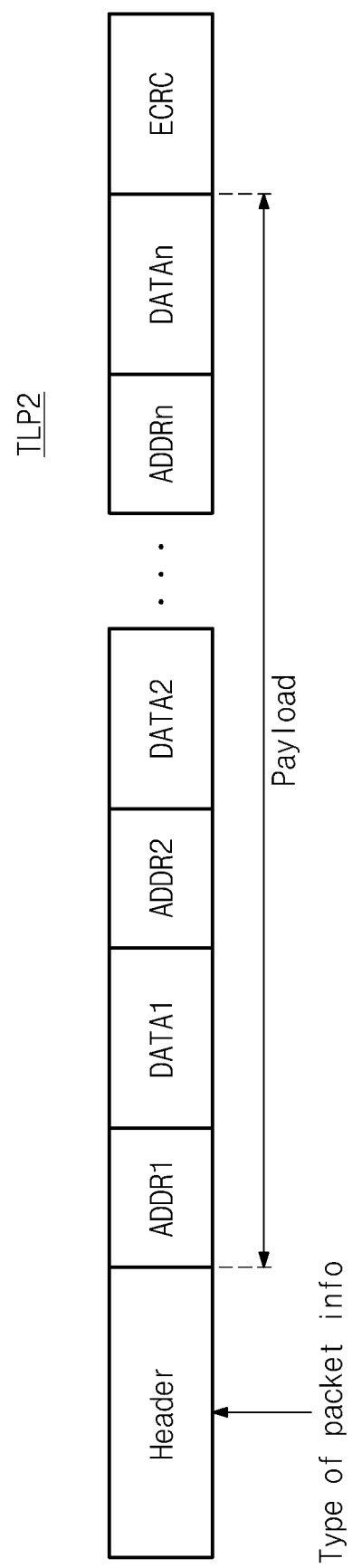
FIG. 6 is a block diagram of a transaction layer packet of a packet according to other example embodiments of the inventive concepts.

FIG. 6 is a block diagram of a transaction layer packet according to other example embodiments of the inventive concepts.

Referring to FIG. 6, a second transaction layer packet TLP2 includes a header, a payload, and an ECRC area. The payload includes meta data that includes a plurality of data DATA1 to DATAn and addresses ADDR1 to ADDRn. The addresses ADDR1 to ADDRn are address information of the data DATA1 to DATAn, respectively.

The header includes information on type of a packet. Specifically, the transmission units 1121, 1212 may store an information bit in the header indicating whether the plurality of data DATA1 to DATAn and multi-data are included. The information bit may be stored in a reserved bit included in the header. However, example embodiments of the inventive concepts are not limited thereto. For example, the information bit on type of a packet may be included in a specific area of the payload.

Figure 7:
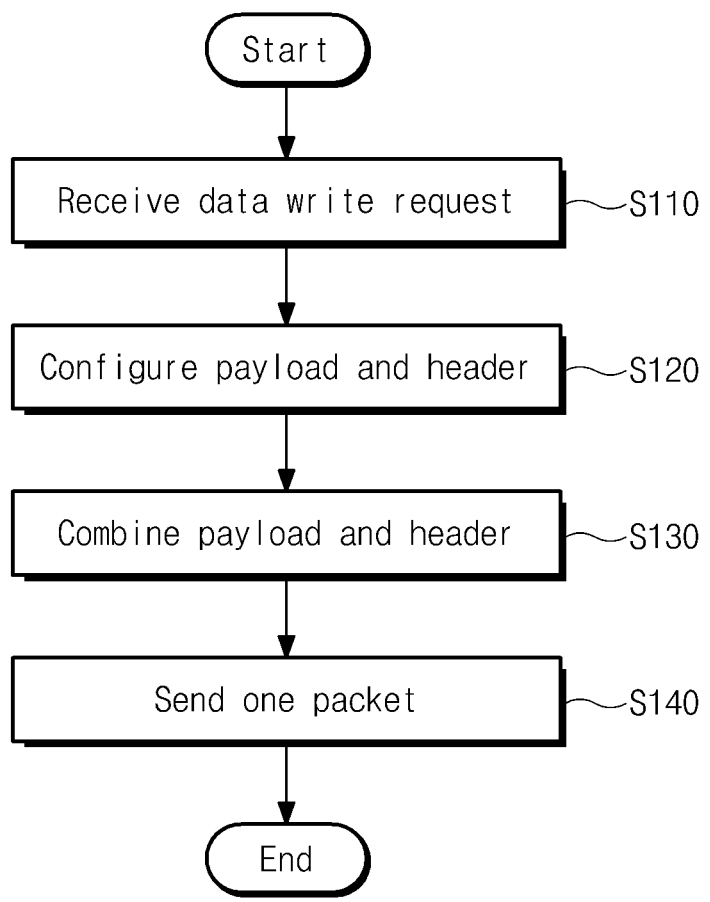
FIG. 7 is a flowchart summarizing a packet transmission method of an interface circuit according to some example embodiments of the inventive concepts.

FIG. 7 is a flowchart summarizing a packet transmission method of an interface circuit according to some example embodiments of the inventive concepts.

Referring to FIGS. 1 to 7, in operation S110, the first interface circuit 1120 may receive a data write request from an external entity or the host processor 1100 via a write command.

When the write command is issued, a plurality of data DATA1 to DATAn stored in a plurality of cache lines CL1 to CLn may be transmitted to and programmed into the storage device 1300. The plurality of data DATA1 to DATAn may be transmitted from the host processor 1100 to the I/O device 1200 through the first interface circuit 1120, and transmitted from the I/O device 1200 to the storage device 1300 through the second interface circuit 1210. If the plurality of data DATA1 to DATAn are separately transmitted efficiency may be reduced due to the amount of overhead required for headers of each of the plurality of DATA1 to DATAn.

In operation S120, the first interface circuit 1120 configures a header and a payload.

To generate the payload, the first payload generator 1121_1 may package the plurality of data DATA1 to DATAn into a single payload as illustrated in FIG. 5. Alternatively, the first payload generator 1121_1 may package meta data including the plurality of data DATA1 to DATAn and a plurality of addresses ADDR1 to ADDRn into a single payload as illustrated in FIG. 6.

To generate the header, the first header generator 1121_2 may configure a header including information to indicate type of a packet. For example, the first header generator 1121_2 may store information indicating whether a plurality of data is included in a payload in a reserved bit of the header. The first header generator 1121_2 may store the addresses ADDR1 to ADDRn for the data DATA1 to DATAn in the header. The first header generator 1121_2 may store a command CMD for a program instruction in the header.

In operation S130, the first combiner 1121_3 may combine the header and the payload with each other to generate a transaction layer packet (TLP), and add additional information to the TLP packet to generate a physical layer packet (PLP).

The transaction layer packet (TLP) may be in the form of one or more of the first and second transaction packets TLP1 and TLP2 illustrated in FIGS. 5 and 6, respectively. The first combiner 1121_3 may add a sequence number, an LCRC, and a framing bit to the transaction layer packet (TLP) to generate and output the physical layer packet (PLP) to the first transmitter 1121_4.

In operation S140, the first transmitter 1121_4 transmits a single packet in the form of the physical layer packet (PLP). For example, the first transmitter 1121_4 may transmit the single packet to the second interface circuit 1210 from the first interface circuit 1120.

Figure 8:
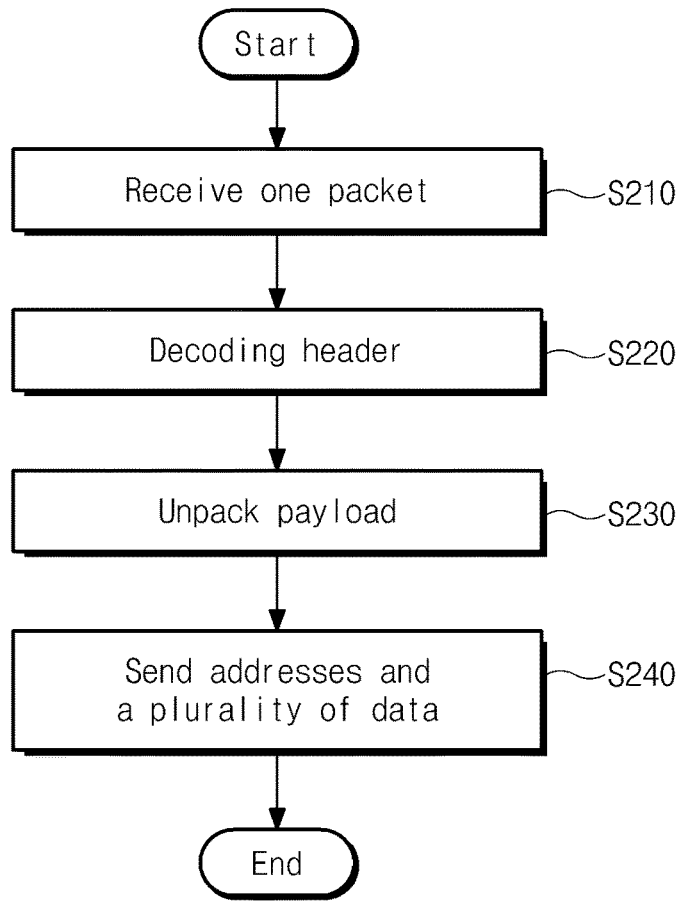
FIG. 8 is a flowchart summarizing a packet receiving method of an interface circuit according to some example embodiments of the inventive concepts.

FIG. 8 is a flowchart summarizing a packet receiving method of an interface circuit according to an embodiment of the inventive concept.

Referring to FIGS. 1, 2 and 8, in operation S210, the second receiver 1211_1 of the second interface circuit 1210 may receive a single packet from the first interface circuit 1120. The second receiver 1211_1 outputs the single packet to the second decoder 1211_2.

In operation S220, the second decoder 1211_2 decodes the single packet. For example, the second decoder 1211_2 decodes a header associated with the single packet. The second decoder 1211_2 determines whether a plurality of data is included in a payload of the single packet based on the decoded header.

In operation S230, if the second decoder 1211_2 determines that the plurality of data is included in the payload, then the second decoder 1211_2 unpacks the payload and checks meta data including the plurality of data DATA1 to DATAn and the addresses ADDR1 to ADDRn included in the payload.

In operation S240, the second interface circuit 1210 checks the addresses ADDR1 to ADDRn and programs each of the plurality of DATA1 to DATAn according to an address.

Figure 9:
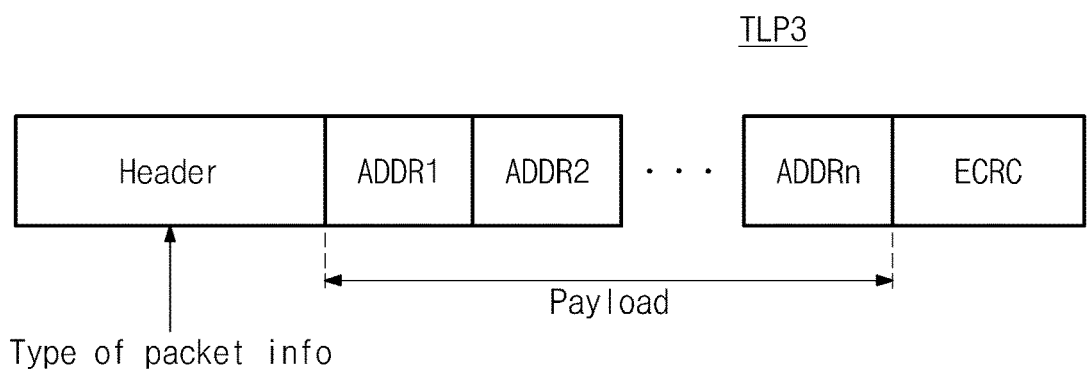
FIG. 9 is a block diagram of a transaction layer packet of a packet according to other example embodiments of the inventive concepts.

FIG. 9 is a block diagram of a transaction layer packet according to other example embodiments of the inventive concepts.

Referring to FIG. 9, FIG. 9 illustrates a third transaction layer packet TLP3 including information on a read command.

Referring to FIGS. 1 to 3 and FIG. 9, when a read command is issued, the host processor 1100 may transmit a plurality of addresses ADDR1 to ADDRn corresponding to data to read from the storage device 1300. If the addresses ADDR1 to ADDRn are output in separate packets, when the host processor 1100 outputs the plurality of addresses ADDR1 to ADDRn, an amount of overhead due to headers for each of the packets may be large, and, therefore may reduce efficiency.

Accordingly, similar to the case when the plurality of data DATA1 to DATAn are transmitted, the first interface circuit 1120 of the host processor 1100 may transmit the plurality of addresses ADDR1 to ADDRn after packaging the addresses ADDR1 to ADDRn into a single packet in the form of meta data. The meta data including the addresses ADDR1 to ADDRn may be packaged into the third transaction layer packet TLP3. The meta data including the addresses ADDR1 to ADDRn may be included in a payload of the third transaction layer packet TLP3. A header may include information on type of a packet. Specifically, first interface circuit 1120 may store information in the header indicating whether the addresses ADDR1 to ADDRn are included in the payload in a reserved bit. The header may include read command information.

Figure 10:
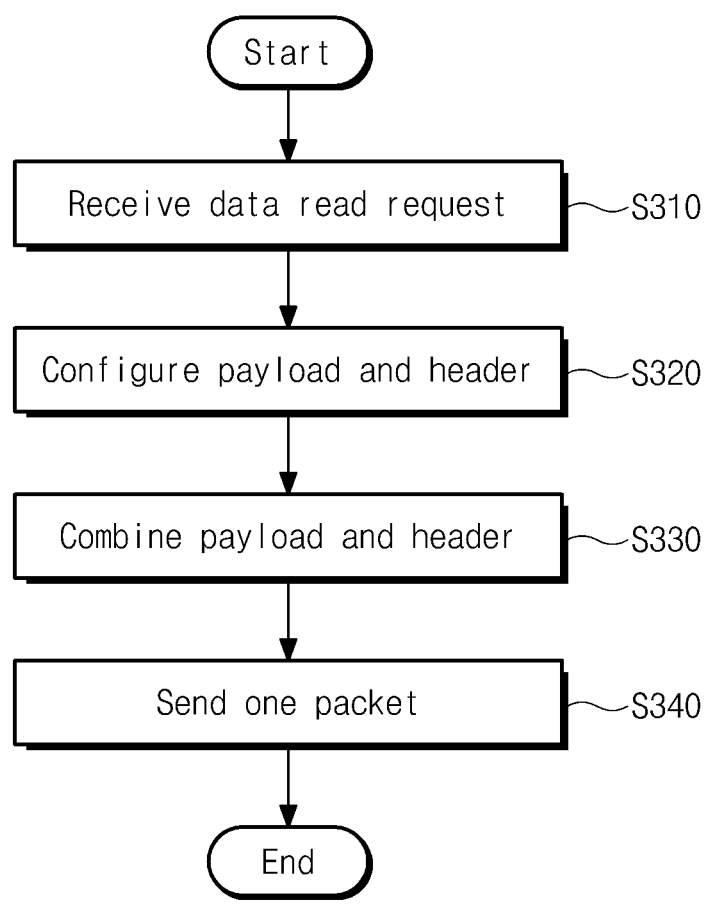
FIG. 10 is a flowchart summarizing a packet transmission method of an interface circuit according to other example embodiments of the inventive concepts.

FIG. 10 is a flowchart summarizing a packet transmission method of an interface circuit according to other example embodiments of the inventive concepts.

Referring to FIGS. 1, 2, 9, and 10, in operation S310, the first interface circuit 1120 may receive a data read request issued from an external entity or the host processor 1100. When the data read request is issued, the host processor 1100 may request reading data from the storage device 1300.

In operation S320, the first payload generator 1121_1 of the first interface circuit 1120 packages meta data including a plurality of addresses ADDR1 to ADDRn into a single payload.

In operation S330, the first interface circuit 1120 may combine the payload and the header to form a transaction layer packet (TLP).

For example, the first header generator 1121_2 may generate a header including information on type of a packet. Specifically, the first header generator 1121_2 may store information on whether the addresses ADDR1 to ADDRn are included in the payload in the reserved bit of the header.

The first combiner 1121_3 may receive the payload and the header to complete and transmit a single packet (S340). Specifically, the first combiner 1121_3 combines the payload and the header with each other to generate a transaction layer packet (TLP). The transaction layer packet (TLP) may be in the form of a third transaction layer packet TLP3. The first combiner 1121_3 may add a sequence number, an LCRC area, and a framing bit to the transaction layer packet (TLP) to generate a single packet in the form of a physical layer packet (PLP).

In operation S340, the first interface circuit 1120 may transmit the single packet to the second interface circuit 1210.

Figure 11:
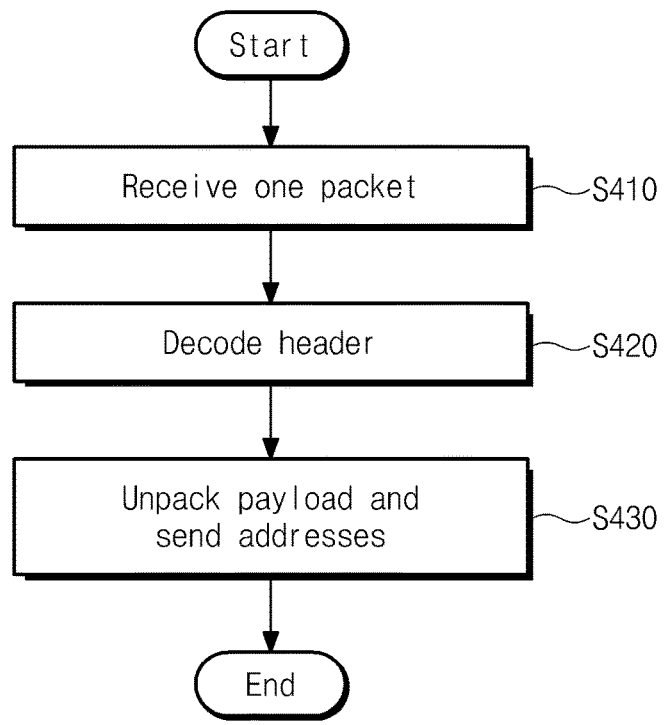
FIG. 11 is a flowchart summarizing a packet receiving method of an interface circuit according to other example embodiments of the inventive concepts.

FIG. 11 is a flowchart summarizing a packet receiving method of an interface circuit according to other example embodiments of the inventive concepts.

Referring to FIGS. 1, 2, 9, and 11, in operation S410 the second receiver 1211_1 of the second interface circuit 1210 may receive a single packet from the first interface circuit 1120. The second receiver 1211_1 may output the single packet to the second decoder 1211_2.

In operation S420, the second decoder 1211_2 decodes a header of the received single packet. For example, the second decoder 1211_2 may decode the header and determine whether a plurality of addresses ADDR1 to ADDRn are included in a payload.

In operation S430, when the addresses ADDR1 to ADDRn are included in the payload, the second decoder 1211_2 analyzes the payload. The second interface circuit 1210 may output the addresses ADDR1 to ADDRn to the storage device 1300.

Figure 12:
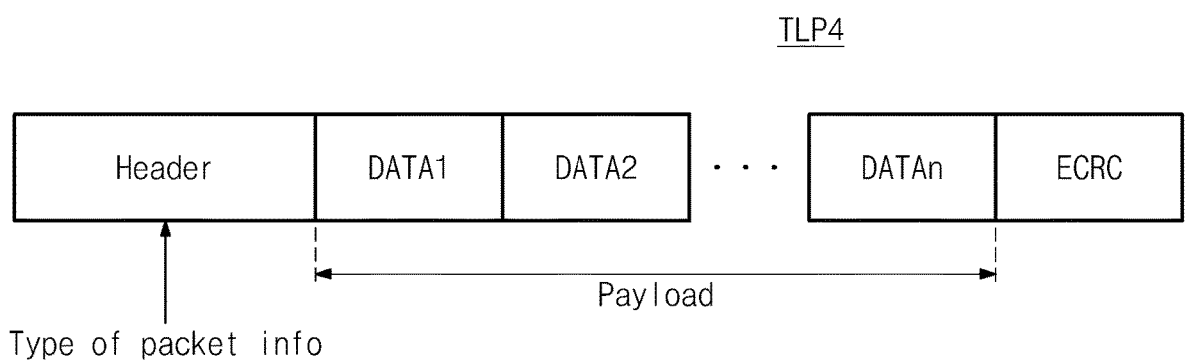
FIG. 12 is a block diagram of a transaction layer packet of a packet according to other example embodiments of the inventive concepts.

FIG. 12 is a block diagram of a transaction layer packet according to another embodiment of the inventive concept.

Referring to FIGS. 1 and 12, FIG. 12 shows a fourth transaction layer packet TLP4 for data read from the storage device 1300 according to a read command. Referring to FIGS. 9 to 11, the storage device 1300 receives a read command and a plurality of addresses ADDR1 to ADDRn from the host processor 1100. The storage device 1300 outputs a plurality of data DATA1 to DATAn corresponding to the addresses ADDR1 to ADDRn to the second interface circuit 1210.

Conventionally, an interface circuit may output the plurality of data DATA1 to DATAn after packaging the plurality of data DATA1 to DATAn into a plurality of packets, respectively. However, the conventional interface circuit may increase overhead generated during transmission.

In contrast, the second interface circuit 1210 may package and transmit the plurality of data DATA1 to DATAn to the fourth transaction layer packet TLP4 in the form shown in FIG. 12. A payload of the fourth transaction layer packet TLP4 may include the plurality of data DATA1 to DATAn. A header may include information on type of a packet. Specifically, the header may store an information bit on whether the plurality of data DATA1 to DATAn are included in the payload in a reserved bit.

Figure 13:
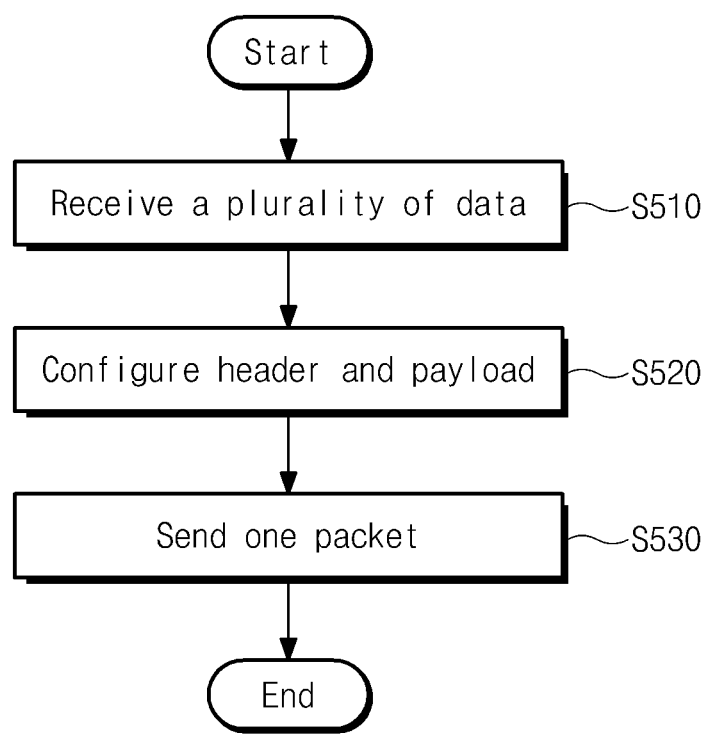
FIG. 13 is a flowchart summarizing a packet transmission method of an interface circuit according to other example embodiments of the inventive concepts.

FIG. 13 is a flowchart summarizing a packet transmission method of an interface circuit according to other example embodiments of the inventive concepts.

Referring to FIGS. 1, 2, 12, and 13, in operation S510, the second payload generator 1212_1 of the second interface circuit 1210 receives a plurality of data DATA1 to DATAn from the storage device 1300.

In operation S520, the second interface circuit 1210 generates a header and a payload. For example, the second payload generator 1212_1 of the second interface circuit 1210 packages a plurality of data DATA1 to DATAn into a single payload. The second header generator 1212_2 may generate a header including information on type of a packet. Specifically, the second header generator 1212_2 may store an information bit on whether the plurality of data DATA1 to DATAn are included in the payload in a reserved bit.

In operation S530, the second interface circuit 1210 completes and outputs a single packet. Specifically, the second combiner 1212_3 of the interface circuit 1210 receives the payload and the header to generate a transaction layer packet (TLP). The transaction layer packet (TLP) may be in the form of the fourth transaction layer packet TLP4 illustrated in FIG. 12. The second combiner 1212_3 adds a sequence number, an LCRC, and a framing bit to the transaction layer packet (TLP) to generate a single packet in the form of a physical layer packet (PLP). The second combiner 1212_3 outputs the single packet to the second transmitter 1212_4. The second transmitter 1212_4 outputs the received single packet to the first interface circuit 1120.

Figure 14:
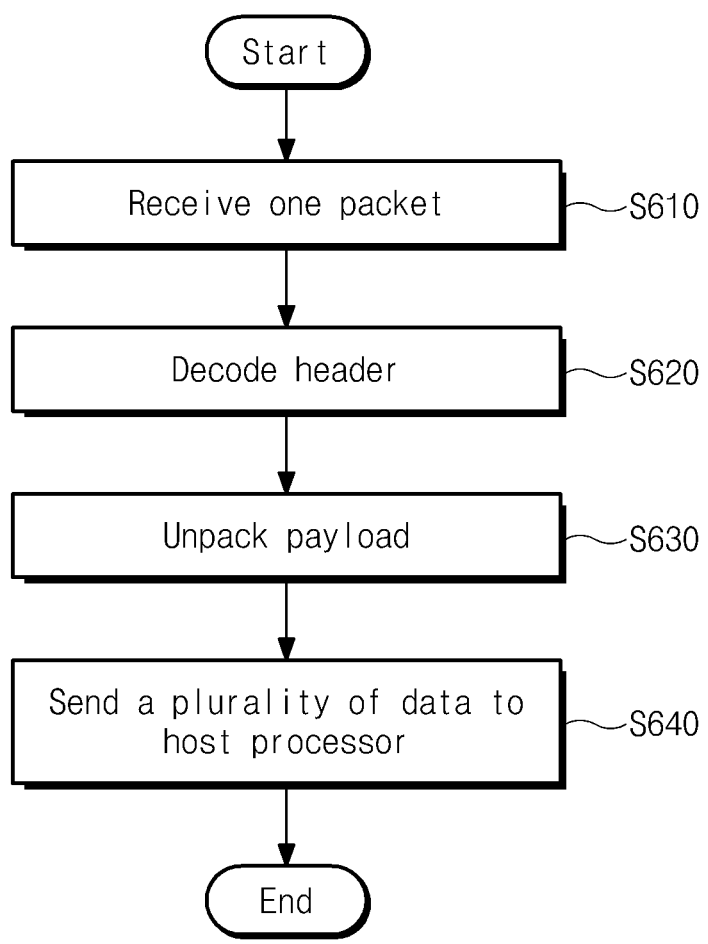
FIG. 14 is a flowchart summarizing a packet receiving method of an interface circuit according to other example embodiments of the inventive concepts.

FIG. 14 is a flowchart summarizing a packet receiving method of an interface circuit according to other example embodiments of the inventive concepts.

Referring to FIGS. 1, 2 and 12 to 14, in operation S610, the first receiver 1122_1 of the first interface circuit 1120 may receive a single packet from the second interface circuit 1210. The first receiver 1122_1 outputs the single packet to the first decoder 1122_2.

In operation S620, the first decoder 1122_2 decodes a header included in the single packet. Specifically, the first decoder 1122_2 of the first interface circuit 1120 decodes the packet and interprets the header. The first decoder 1122_2 may check whether a plurality of data DATA1 to DATAn are included in the single packet, through the header.

In operation S630, when the plurality of data DATA1 to DATAn are included in the single packet, the first decoder 1122_2 interprets a payload. The first decoder 1122_2 may interpret the payload to read the plurality of data DATA1 to DATAn.

In operation S640, the first interface circuit 1120 may store the plurality of data DATA1 to DATAn in the host processor 1100. The plurality of data DATA1 to DATAn may be stored in a plurality of cache lines CL1 to CLn of the host processor 1100, respectively.

Figure 15:
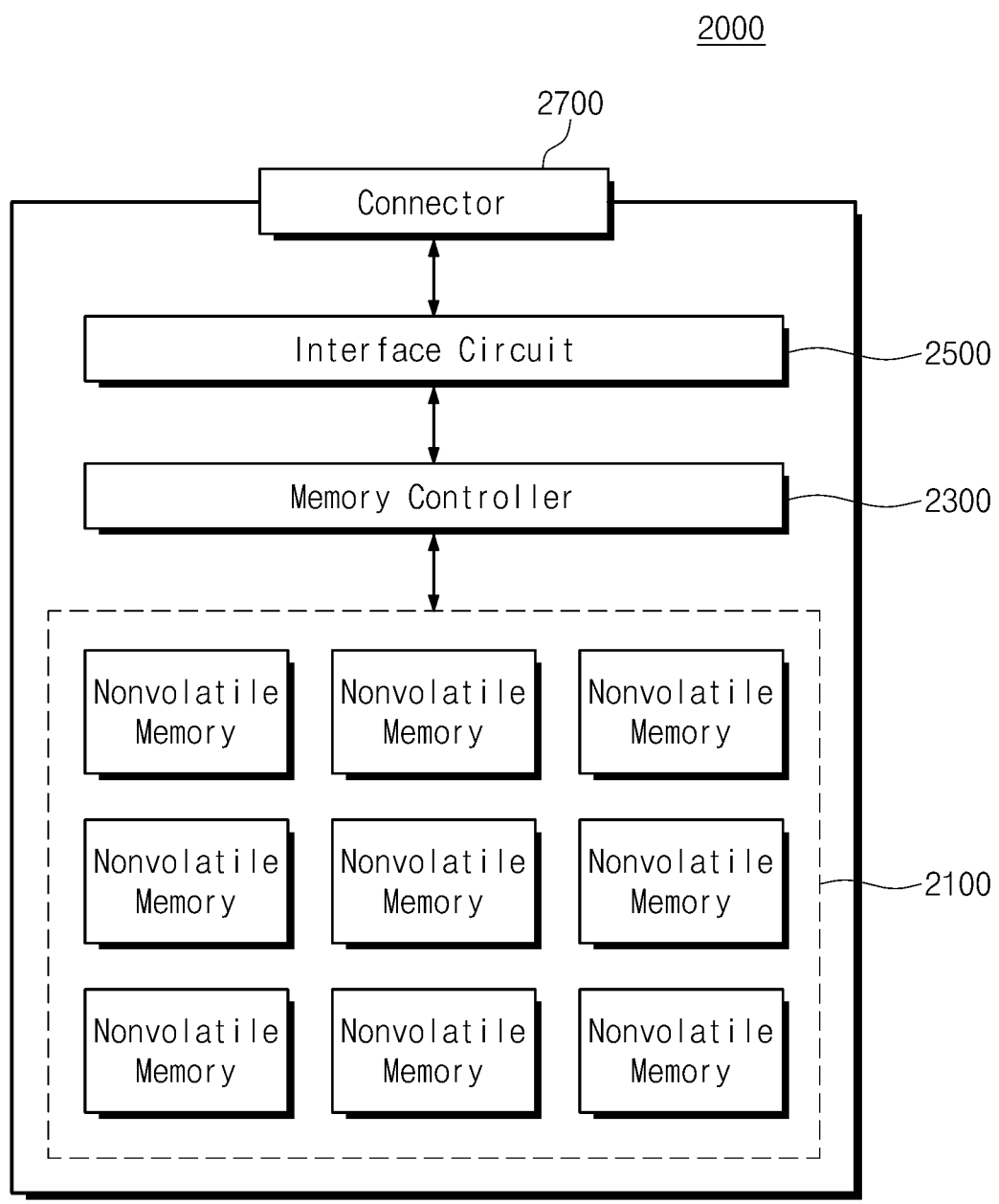
FIG. 15 is a block diagram illustrating a configuration that a storage device including an interface circuit according to some example embodiments of the inventive concepts may have.

FIG. 15 is a block diagram illustrating a configuration that a storage device 2000 including an interface circuit according to some example embodiments of the inventive concepts may have.

Referring to FIG. 15, the storage device 2000 may include a plurality of nonvolatile memories 2100, a memory controller 2300, an interface circuit 2500, and a connector 2700.

Each of the nonvolatile memories 2100 may store data. In some example embodiments, each of the nonvolatile memories 2100 may be a flash memory. For example, the storage device 2000 may be a solid-state drive (SSD). However, the example embodiments are not limited to the above embodiment. For example, each of the nonvolatile memories 2100 may include at least one of nonvolatile memories such as a phase-change RAM (PRAM), a magnetic RAM (MRAM), a resistive RAM (RRAM), and a ferroelectric RAM (FRAM). The operation of the nonvolatile memories 2100 may be controlled by the memory controller 2300.

The interface circuit 2500 may interface data reception and transmission between a host (not shown) and the storage device 2000. The interface circuit 2500 may be configured to transmit and receive a packet including a plurality of data according to example embodiments of the inventive concepts. That is, when there is a plurality of data to transmit, the interface circuit 2500 may perform at least one of the packet transmission and reception operations described with reference to FIGS. 1 to 14.

The connector 2700 is configured to connect the storage device 2000 to the host. In some example embodiments, the interface circuit 2500 may operate according to the PCIe protocol. For example, the connector 2700 may be configured to make communication according to the PCIe protocol possible.

In FIG. 15, the storage device 2000 has been described as a device including the interface circuit 2500. However, the interface circuit 2500 may be included in other electronic devices. For example, the interface circuit 2500 according to some example embodiments of the inventive concepts may be included in various electronic devices such as a mainboard, a printer, a scanner, and a modem. Furthermore, when the interface circuit 2500 operates according to the PCIe protocol, the interface circuit 2500 may be included in an electronic device such as a graphic card and a sound card.

Figure 16:
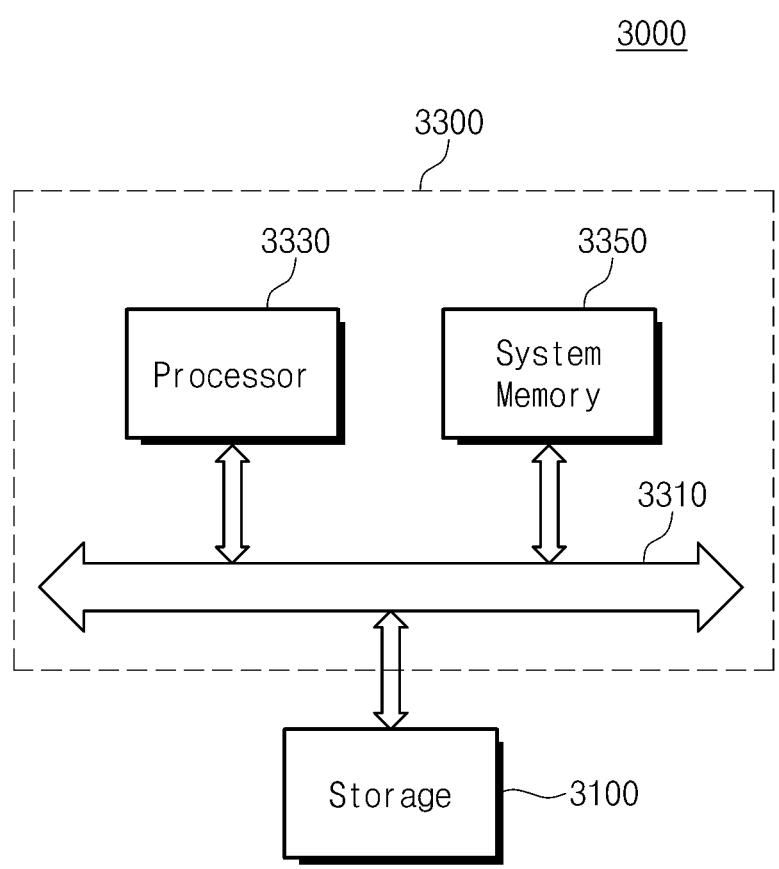
FIG. 16 is a block diagram illustrating a configuration that a computing device including a storage device according to other example embodiments of the inventive concepts may have.

FIG. 16 is a block diagram illustrating a configuration that a computing device 3000 including a storage device according to other example embodiments of the inventive concepts may have.

Referring to FIG. 16, the computing system 3000 may include host 3300 and a storage device 3100. The host 3300 may have a bus 3310, a processor 3330, and a system memory 3350. The storage device 3100 may have the same configuration as the storage device 2000 (see FIG. 15). The description of the configuration and function of the storage device 3100 will be omitted within the range duplicate with those in FIG. 15.

The bus 3310 may provide a communication channel between components of the computing system 3000. For example, the bus 3310 may provide a communication channel between the storage device 3100, the processor 3330, and the system memory 3350. The bus 3310 may provide a communication channel between other components (not shown in FIG. 16). The bus 3310 may operate according to the standard interface protocol of the computing system 3000. In some example embodiments, the bus 3310 may operate according to the PCIe protocol. However, the embodiments are just exemplary and the bus 3310 may operate according to various communication protocols.

The processor 3330 may control components of the computing system 3000 through the bus 3310. In some embodiments, the processor 3330 may control components of the computing system 3000 according to the PCIe protocol. In some embodiments, the processor 3330 may be a central processing unit (CPU) or an application processor.

The system memory 3350 may communicate with the processor 3330 and the storage device 3100 through the bus 3330. The system memory 3350 may include a volatile memory such as static RAM (SRAM), dynamic RAM (DRAM), and synchronous DRAM (SDRAM) or a nonvolatile memory such as PRAM, MRAM, RRAM, and FRAM.

The host 3300 may load data stored in the storage device 3100 or transmit data stored in the storage device 3100.

The storage device 3100 may include a memory controller 2300 (see FIG. 15). The memory controller 2300 may have device information recognized by the bus 3310 or the processor 3330. For example, when the storage device 3100 is connected to the bus 3310 by the connector 2700 (see FIG. 15), the memory controller 2300 may perform desired (or, alternatively, predetermined) communication with the bus 3310 or the processor 3330. Due to the communication performed, the storage device 3100 may be identified as a storage device by the bus 3310 or the processor 3330.

Figure 17:
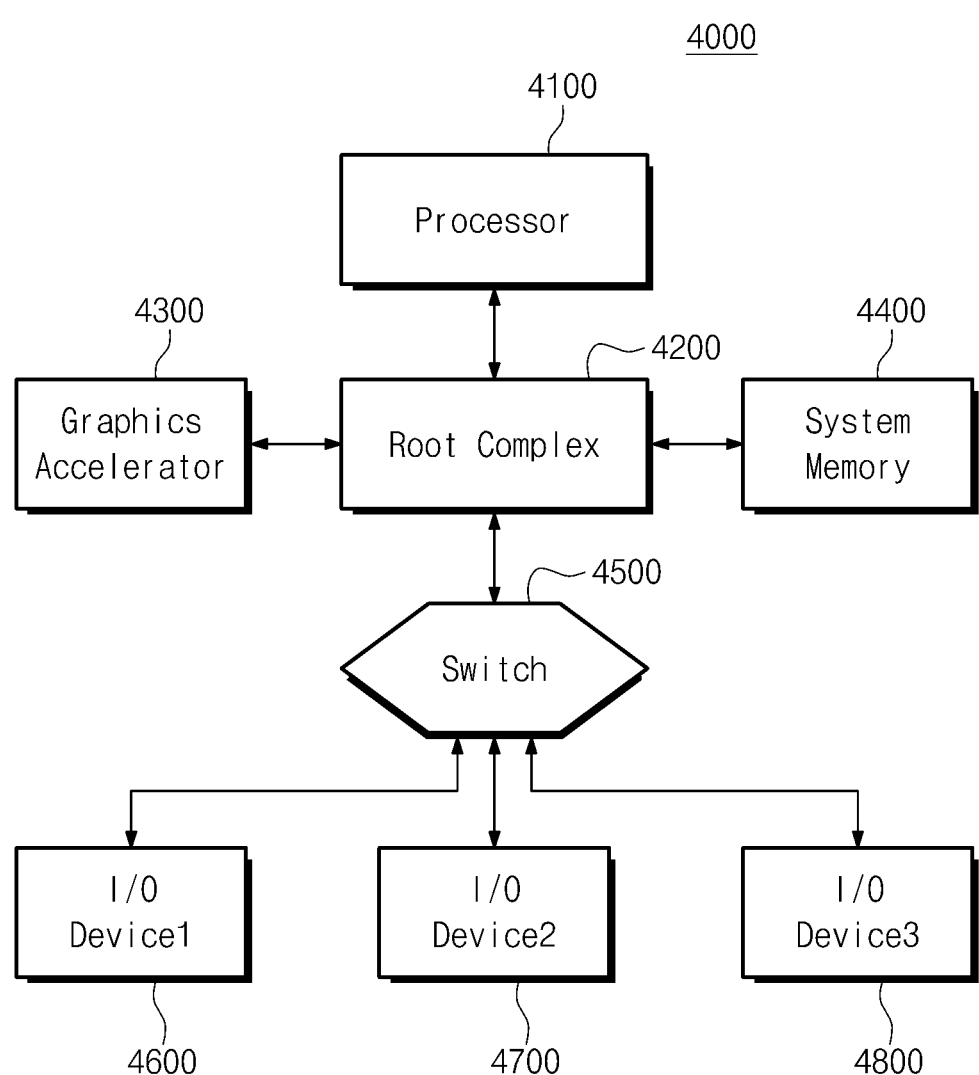
FIG. 17 is a block diagram of a computing device according to other example embodiments of the inventive concepts.

FIG. 17 is a block diagram of a computing device 4000 according to other example embodiments of the inventive concepts.

Referring FIG. 17, the computing device 4000 may include a processor 4100, a root complex 4200, a graphics accelerator 4300, a memory system 4400, a switch 4500, and first to third I/O devices 4600 to 4800.

The processor 4100 may control components of the computing device 4000. The processor 4100 may be connected to the root complex 4200. The processor 4100 and the root complex 4200 may be connected to each other through an interface circuit. The interface circuit may operate according to the PCIe protocol. The processor 4100 may control the graphics accelerator 4300, the system memory 4400, and the first to third I/O devices 4600 to 4800 through the root complex 4200.

The root complex 4200 may serve to connect the processor 4100 with the graphics accelerator 4300, the system memory 4400, and the switch 4500 through the interface circuit. The interface circuit may operate according to the PCIe protocol. The interface circuit of the root complex 4200 may transmit and receive a packet including a plurality of data and addresses described in FIGS. 1 to 14 after packaging or decoding the packet.

The graphics accelerator 4300 may be connected to the root complex 4200. The graphics accelerator 4300 is a device used to accelerate graphic processing speed. Instead of the processor 4100, the graphics accelerator 4300 may process graphics to reduce a burden of the processor 4100.

The system memory 4400 may communicate with the processor 4100 through the root complex 4200. The system memory 4400 is controlled by the processor 4100. The system memory 4400 may include a volatile memory such as static RAM (SRAM), dynamic RAM (DRAM), and synchronous DRAM (SDRAM) or a nonvolatile memory such as PRAM, MRAM, RRAM, and FRAM.

The switch 4500 may control communication between the root complex 4200 and the first to third I/O devices 4600 to 4800. In addition, the switch 4500 may control communication between the first to third I/O devices 4600 to 4800. The switch 4500 may output a packet received from the root complex 4500 to one of the first to third I/O devices 4600 to 4800. In addition, the switch 4500 may output a packet received from one of the first to third I/O devices 4600 to 4800 to the processor 4100 or another I/O device. The switch 4500 may communicate with the root complex 4200 and the first to third I/O devices 4600 to 4800 through an interface circuit. The interface circuit may operate according to the PCIe protocol.

The first to third I/O devices 4600 to 4800 may communicate with the root complex 4500 through the switch 4500. In addition, the first to third I/O devices 4600 to 4800 may communicate with each other through the switch 4500, which is called point-to-point communication. A PCIe interface circuit may perform point-to-point communication. The first to third I/O devices 4600 to 4800 may communicate through an interface circuit. The first to third I/O devices 4600 to 4800 may transmit or receive a packet including a plurality data and addresses described with reference to FIGS. 1 to 14 after packaging or decoding the packet.

The device configuration shown in each block diagram is provided to understand the inventive concept. Each block may include sub-blocks according to functions. Alternatively, a plurality of blocks may constitute a larger-unit of block. That is, the inventive concept is not limited to the configuration shown in each block diagram.

As described above, an interface circuit according to some example embodiments of the inventive concepts may package a plurality of data into a transaction layer packet to transmit more data at one time. Thus, an interface circuit with improved efficiency may be provided.

While the example embodiments have been particularly shown and described with reference to some example embodiments thereof, the example embodiments of the inventive concepts are not limited to the above-described embodiments. It will be understood by those of ordinary skill in the art that various changes and variations in form and details may be made therein without departing from the spirit and scope of the example embodiments of the inventive concepts as defined by the following claims.

What is claimed is:

1. An interface circuit for transmitting and receiving first and second packets according to the Peripheral Component Interconnect Express (PCIe) protocol, the interface circuit comprising:
   a reception circuit configured to receive the second packet; and
   a transmission circuit configured to output the first packet, the transmission circuit including, a payload generator configured to package a plurality of data into a payload of a transaction layer packet, a header generator configured to generate a header of the transaction layer packet, the header including a bit indicating the plurality of data is packaged into the payload, a combiner configured to generate the first packet from the transaction layer packet such that the first packet includes the payload, the header, and additional information, the additional information including at least a first CRC area and at least a pair of framing bits, the first CRC area including a transmission error check code of the plurality of data and the pair of framing bits indicating ends of the transaction layer packet within the first packet, and a transmitter configured to output the first packet.

2. The interface circuit as set forth in claim 1, wherein the header generator is configured to generate the header such that the header includes meta data to indicate addresses for the plurality of data.

3. The interface circuit as set forth in claim 1, wherein the payload generator is configured to generate the payload such that the payload includes meta data to indicate addresses for the plurality of data.

4. The interface circuit as set forth in claim 1, wherein the combiner is configured to generate a data link layer packet such that the data link layer packet includes a sequence number and a second CRC area at the ends of the transaction layer packet.

5. The interface circuit as set forth in claim 4, wherein the combiner is configured to generate the first packet from the data link layer packet such that the first packet is a physical layer packet having the pair of framing bits that indicate the ends of the transaction layer packet added to both ends of the data link layer packet.

6. The interface circuit as set forth in claim 1, wherein the reception circuit includes, a receiver configured to receive the second packet; and a decoder configured to determine whether the plurality of data is packaged into the second packet, and to decode a payload of the second packet to output the plurality of data.

7. The interface circuit as set forth in claim 6, wherein the decoder is configured to determine whether the plurality of data is packaged by interpreting the second packet.

8. The interface circuit as set forth in claim 6, wherein the plurality of data is stored in a plurality of cache lines of a host processor, and the interface circuit is configured to transmit the plurality of data after packaging the data into the first packet.

* * * * *